Dec. 3, 1968  L. R. TRAVIS  3,414,867
TERMINATION OF CABLE
Filed April 13, 1967  3 Sheets-Sheet 1

INVENTOR.
LAWRENCE R. TRAVIS
BY
McLean, Morton and Bastead
ATTORNEYS

Dec. 3, 1968　　　　L. R. TRAVIS　　　3,414,867
TERMINATION OF CABLE
Filed April 13, 1967　　　　　　　　　　3 Sheets-Sheet 2

*INVENTOR.*
LAWRENCE R. TRAVIS
BY
*McLean, Morton and Boustead*
ATTORNEYS

Dec. 3, 1968   L. R. TRAVIS   3,414,867
TERMINATION OF CABLE
Filed April 13, 1967   3 Sheets-Sheet 3

INVENTOR.
LAWRENCE R. TRAVIS
BY
McLean, Morton and Boustan
ATTORNEYS

# United States Patent Office 3,414,867
Patented Dec. 3, 1968

3,414,867
TERMINATION OF CABLE
Lawrence R. Travis, Brockton, Mass., assignor to Electro Connective Systems, Inc., a corporation of Massachusetts
Filed Apr. 13, 1967, Ser. No. 630,598
5 Claims. (Cl. 339—99)

ABSTRACT OF THE DISCLOSURE

Termination device for flat electric cable including a contact element having conductor gripping jaws and a device for holding the jaws open against resilient biasing to permit insertion of a portion of a cable between the jaws and for releasing the jaws in response to such insertion such that the resultant inward motion takes place simultaneously with the cable insertion to provide a raking contact movement of the conductor gripping jaws as they grip the conductor.

Specification

This invention relates to termination of the electric conductors and has particular applicability to termination of conductors contained in flat cable. "Termination" is intended to include not only connection with a conductor at an end of the conductor but also connection with a conductor at a position between the ends of the conductor.

Recently there has been increasing demand, particularly in the computer and aerospace industries, for compact, lightweight flexible connective harnesses for interconnecting electronic components. This demand has resulted, in an increasing use of "flat cable" and "ribbon cable," i.e. multi-conductor cables in which conductive strands are generally positioned coplanar one with the other and spaced from each other in a dielectric covering which functions not only to insulate the conductors, but also to hold them spaced from each other.

Harnesses and other similar devices made of flat cable and ribbon cable are normally interconnected with each other and with associated electronic components by means of flat plugs, sockets and splicing devices having aligned contacts corresponding to the conductor locations in the cable. Such connective devices are positioned on an end or along the bight of the cable where termination with one or more conductors in the cable is desired. A portion of the dielectric covering at such position is removed, either chemically or mechanically, to expose the underlying conductors to permit connection of contacts in the connective device to such conductors which preferably is molded or otherwise permanently affixed to the cable. Manufacture of such devices usually involves techniques and equipment which are not readily available in field repair work, laboratory work and where the cable is sold in bulk and cut and used to fit each installation as required.

It is therefore a general object of this invention to provide a termination for flat and ribbon cable which can be installed in the field to provide mechanically and electrically sound contact with one or more conductors of the cable using only simple tools and without the requirement of special equipment.

It is also an object of this invention to provide such a termination which upon connection with the cable has a raking action for piercing the dielectric covering of the cable at the location of each conductor, which is the result not only of an individually acting resilient element but also of the motion required to affix the termination to the cable, without pressure on the housing of the termination and without build-up of dimensional tolerances.

The cable termination of the present invention fundamentally utilizes a resilient contact member for each particular conductor to be contacted which is provided with a pair of gripping jaws, preferably provided with teeth to cut through a dielectric covering to provide connection with the underlying conductor. Preferably the cable is mounted about a rigid mandrel in order to insure positive backing to facilitate engagement with teeth on the jaws of the contact member. In accordance with the present invention a wedge device is provided partially inserted into the throat between the jaws of the contact member or members in a manner that holds the jaws apart from their normal unstressed position to permit free entry of the cable portion to be terminated between the jaws. The wedge device is so positioned that upon insertion of the cable between the jaws the wedge device is forced by the cable to a more fully inserted position in the throat where the throat is enlarged to release the wedging action simultaneously with the movement of cable insertion thereby to allow the jaws to return to their unstressed position at which they bite at an angle with respect to the line of movement of the cable to pierce the dielectric covering of the cable making firm mechanical and electrical contact with a conductor in the cable.

It will be appreciated that where more than one contact element is utilized in order to make individual contact with two or more conductors within the cable, the several contact elements are aligned with each other in a direction transversely located with respect to the point of cable entrance between the jaws of the contact elements. It will further be appreciated that the contact element or elements will normally be housed in a receptacle which can further include plugs, sockets and splicing devices for connection to other electric components or which can also contain one or more further sets of contact members for similarly receiving the ends of other cables. It will also be appreciated that where the dielectric covering is removed, for example, by abrasion to expose the conductors the contact member need not include teeth in order to penetrate the dielectric but may make adequate contact by wiping action alone.

For a more complete understanding of the practical application of this invention, reference is made to the appended drawings in which.

Figure 1:
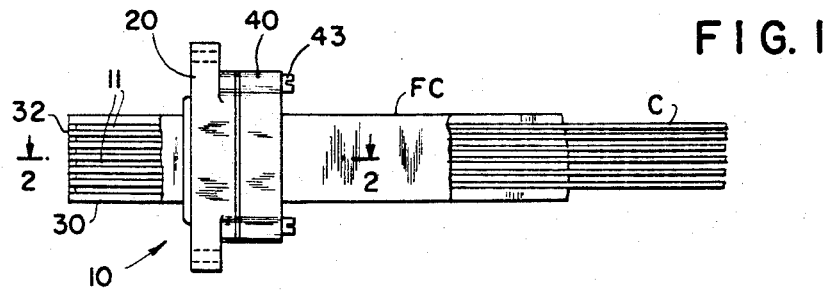
FIG. 1 is an elevation of a plug-type termination device on the end of a cable in accordance with the present invention.
Figure 2:
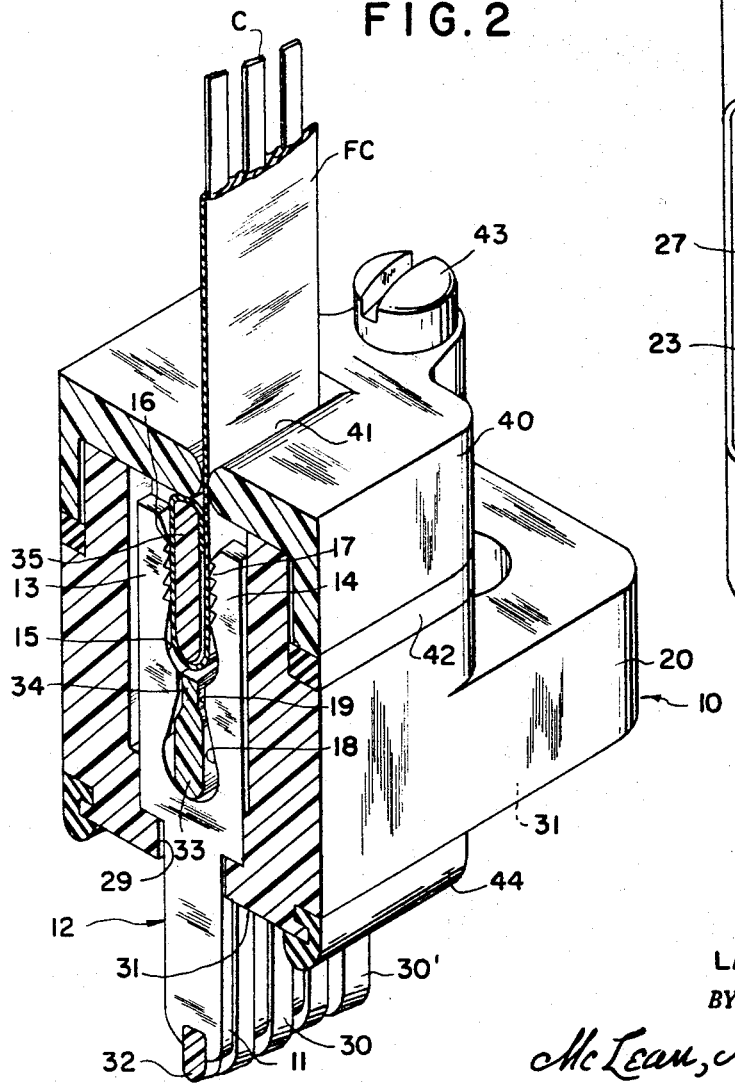
FIG. 2 is an isometric view of the device shown in FIG. 1 taken along section line 2—2.
Figure 3:
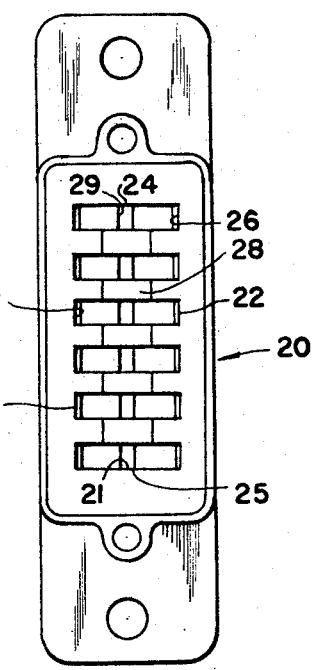
FIG. 3 is an end view of a part of the device shown in FIG. 1.

Referring more particularly to FIGS. 1, 2 and 3 there is illustrated a plug 10 for terminating the end of a flat cable FC having a plurality of relatively rigid tines 11 positioned aligned and parallel to each other for reception in the aligned socket contacts of a receptacle similar to those conventionally used in the printed circuit industry for receiving a printed circuit plugboard.

Referring more particularly to FIG. 2, it will be seen that each of tines 11 is integrally formed as an end of part of a relatively flat, resilient contact element 12 made of a resilient conductive material, such as beryllium copper, which has preferably been gold plated. The other end of element 12 is formed as a pair of confronting jaws 13 and 14 which form a throat 15 between their confronting surfaces which extends deeply into contact member 12 toward tine 11. Generally the confronting surfaces of jaws 13 and 14 defining the throat portion 15 of contact member 12 have three significant portions. In their outer portions, where jaws 13 and 14 form a mouth, the confronting surfaces of jaws 13 and 14 are serrated to form teeth, as indicated by the reference numerals 16 and 17, respectively. In the innermost portion of the throat 15, indicated by the reference numeral 18, the confronting surfaces of jaws 13 and 14 are relatively farther spaced apart than they are in an intermediate portion 19 of throat 15 which lies between the outer portions 16 and 17 of jaws 13 and 14 and the inner portion 18 of throat 15.

Contact elements 12, which are of a thickness which is limited on one hand by the section modulus required and on the other hand by the spacing of the individual conductors C of flat cable FC, are mounted in a dielectric block 20 (see FIG. 3) which is slotted to receive them and hold them firmly spaced one from the other in registry with their throats 15 aligned across block 20. More specifically, block 20 is provided on one side with a deep well 21 of generally rectangular cross-section, two parallel sides 22 and 23 of which are substantially longer than the other parallel sides 24 and 25. Sides 22 and 23 are provided with pairs of parallel confronting grooves 26 and 27 which extend from the open end of well 21 to its bottom 28. The configuration of each pair of grooves 26 and 27 is such as to receive the outer edges of a pair of jaws 13 and 14 of a contact member 12, while bottom 28 of well 21 is provided with slots 29 associated between each pair of grooves 26 and 27 to permit tines 11 to extend downwardly through bottom 28 to seat each contact member 12 in well 21 between a pair of confronting grooves 26 and 27. Slots 28 open through a face 31 of block 20 between a series of parallel ribbed projections 30 extending from such face of block 20 such as to firmly separate electrically each of tines 11 as it extends through slot 29. Ribs 30 terminate at their ends remote from face 31 in a crosspiece 32 integrally formed with ribs 30, and tines 11 are notched to receive crosspiece 32 at their ends remote from throat 15 when contact members 12 are firmly seated in well 21. It will be noted particularly with reference to FIGS. 2 and 3 that grooves 26 and 27 are enlarged throughout most of their length to permit some outward movement of jaws 13 and 14 and receive jaws 13 and 14 only firmly adjacent their inner ends where throat 15 terminates and tines 11 are joined to jaws 13 and 14.

Figure 4:
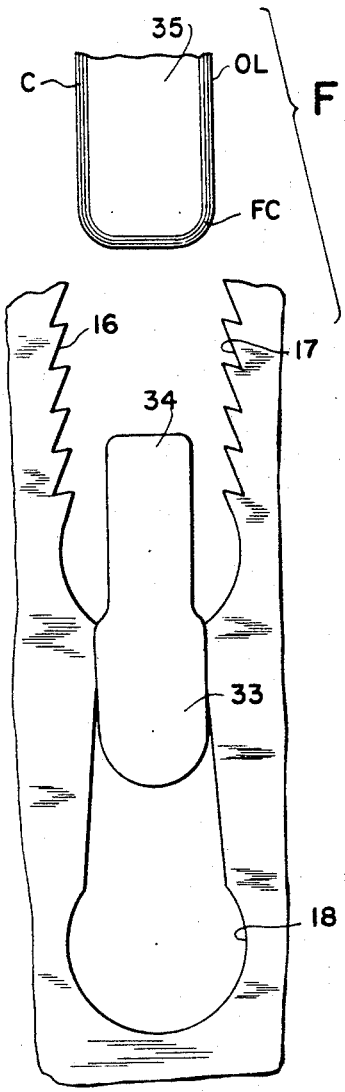
FIG. 4 is a schematic representation of a termination device in accordance with the present invention prior to connection with a cable.

A wedge bar 33, as shown as schematic representation in FIG. 4, is initially positioned in throat 15 in its narrower portion 19. The portion of wedge bar 33 facing inner portion 18 of throat 15 is lodged in portion 19 and is of such a size as to hold jaws 13 and 14 apart from their normal unstressed condition such that teeth 16 and 17 are biased apart. As will be evident, wedge bar 33 extends across well 21 similarly stressing each of contact 12 to hold each pair of jaws 13 and 14 slightly further apart than in normal unstressed position. It will be further noted that the size of inner facing portion of wedge bar 33 is sufficiently small to fit freely within inner portion 18 of throat 15 without interfering with jaws 13 and 14. It will also be noted that wedge bar 33 has an outer portion 34 extending along its edge facing the outer portion of throat 15 which is of somewhat narrower dimension, such that it fits freely in restricted intermediate portion 19 of throat 15 when wedge bar 33 is dislodged from its position shown in FIG. 4 into the position shown in FIGS. 2 and 7.

Again referring to FIG. 4 the portion of the flat cable FC to be terminated is wrapped about a mandrel 35 of dielectric board which is of a size to fit freely between jaws 13 and 14 when stressed as shown in FIG. 4 but which is larger than the separation of teeth 16 and 17 when jaws 13 and 14 are unstressed by removal of wedge bar 33.

Figure 5:
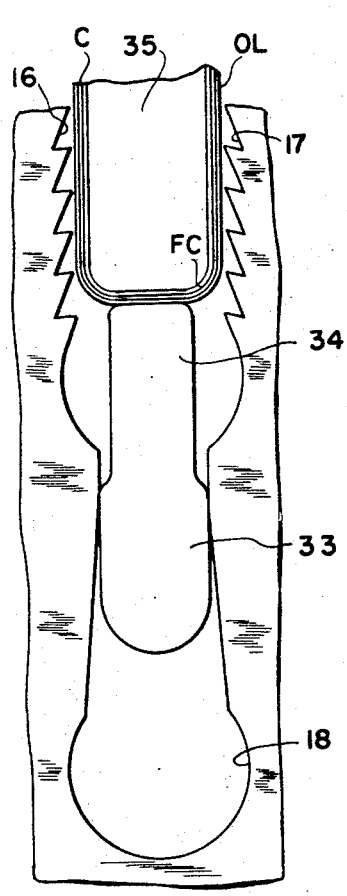
FIG. 5 is a schematic representation similar to FIG. 4 in which the cable is partially inserted into the termination device.

Referring to FIG. 5 the thusly wrapped mandrel 35 is then forced into the mouth of well 21, which it is freely able to do because of the positioning of wedge bar 33, until it abuts the outer end of outer portion 34 of wedge bar 33 at a position in which a substantial portion of flat cable FC lies between jaws 13 and 14.

Figure 6:
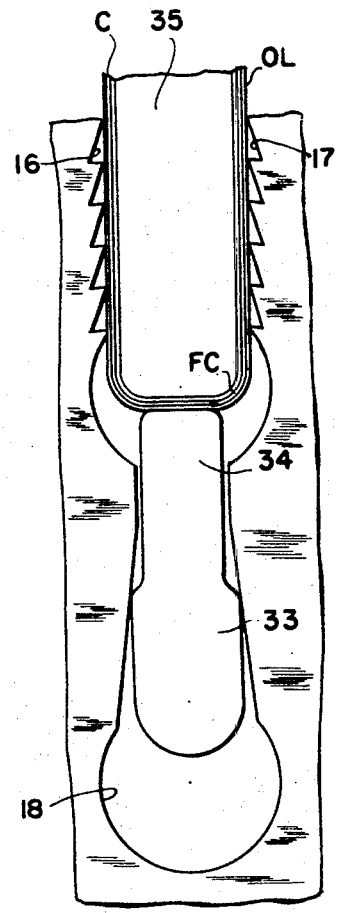
FIG. 6 is a view similar to FIG. 4 in which the cable is further inserted into the termination device.

As can best be shown in FIG. 6, with continued insertion of the end of cable FC mandrel 35 pushes against the portion 34 of wedge bar 33 forcing wedge bar 33 gradually into the inner portion 18 of throat 15 during which movement of wedge bar 33 the stress on jaws 13 and 14 is simultaneously relieved allowing teeth 16 and 17 to be drawn together by the resilient springing action of jaws 13 and 14 until teeth 16 and 17 penetrate the outer exposed surfaces of flat cable FC angularly into contact with conductor C. The configuration of portions 18 and 19 of throat 15 and the configuration of wedge bar 33 are such that the inward movement of teeth 16 and 17 takes place gradually as wedge bar 33 moves between throat portions 19 and 18. Thus by raking teeth 16 and 17 toward the open end of throat 15 the force applied to move wedge bar 33 inwardly also aids in causing teeth 16 and 17 to dig into cable FC, and reliance is not placed solely on the resiliency of contact elements 12 in order to penetrate cable FC.

Figure 7:
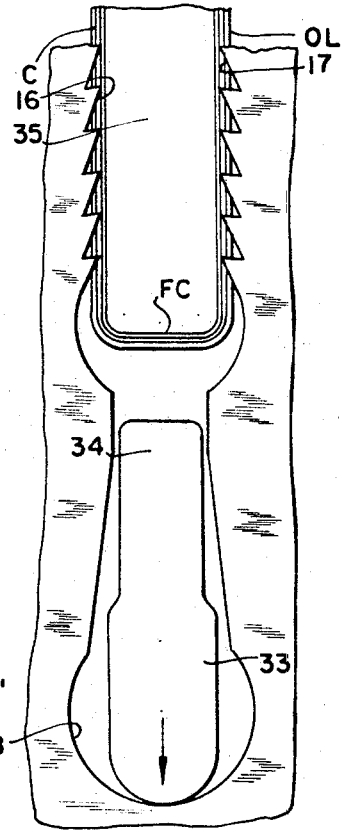
FIG. 7 is a view similar to FIG. 4 in which the cable is fully inserted into the termination device.

At full insertion of the end of cable FC, as shown in FIG. 7, it will be seen that wedge bar 33 is freely received in inner throat 18 and effective mechanical and electrical contact has been made by the teeth 16 and 17 of each contact element 12 piercing through to a conductor C.

A cap 40 can be provided for covering the open end of wall 21 as shown in FIGS. 1 and 2. Cap 40 desirably includes a slit 41 for receiving the end of flat conductor C prior to termination which forms a wiping type seal with flat conductor FC, to which end cap 40 is made of suitable resilient material, such as neoprene. A gasket 42 is provided to insure tight closure of the cap 40 and block 20, both cap 40 and block 20 having registering bosses for receiving screws 43 or other fastening devices to hold cap 40 on block 20. Similarly face 31 is provided about its perimeter with a neoprene facial seal or the like for impinging the rear of the receptacle to which plug 10 is to be connected.

Figure 8:
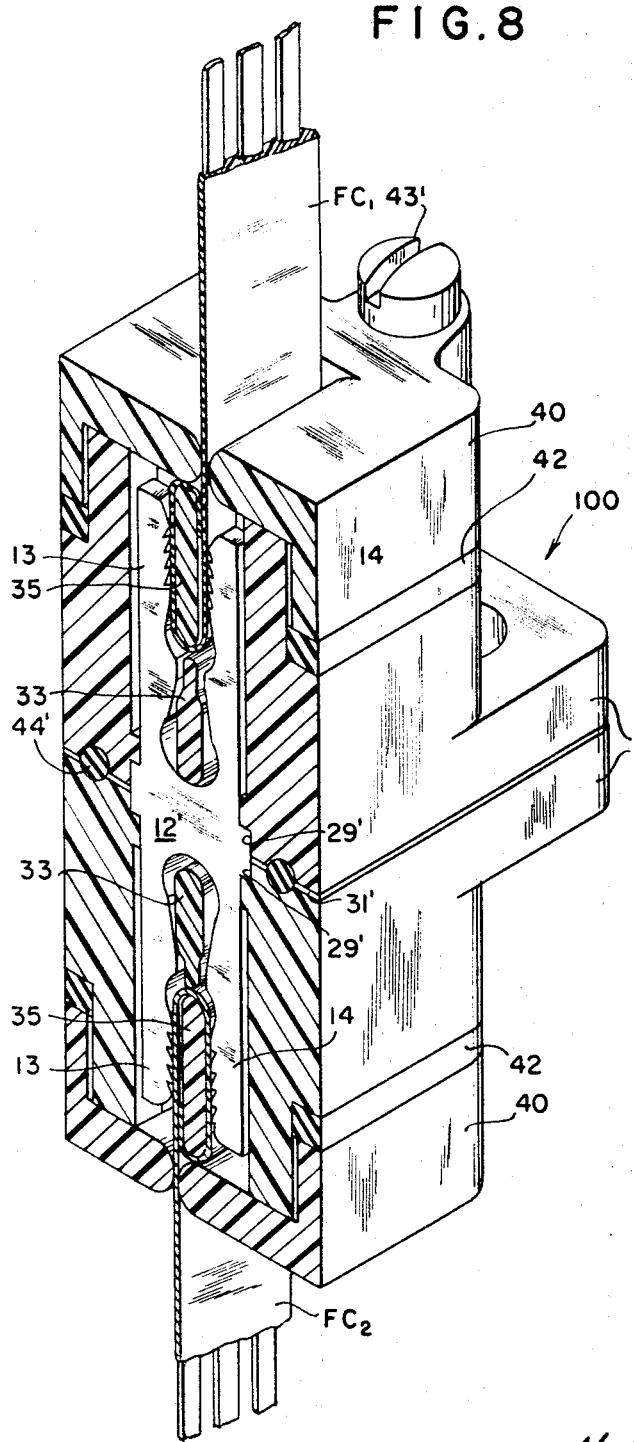
FIG. 8 is a sectioned isometric view of a connector splice in accordance with the present invention for joining the ends of a pair of cables.

While generally the preceding discussion is with reference to a termination for forming a plug on a flat conductor, it will be apparent that tines 11 can readily be replaced by sockets of conventional configuration with appropriate modification of block 20 to form a receptacle termination, or, as illustrated in FIG. 8, by replacement of tines 11 with additional jaws on the contact elements the plug shown in FIGS. 1–3 can be converted to a splice. In FIG. 8, the same reference numerals as were used with reference to FIGS. 1–3 are used to denote parts which are identical to those in FIGS. 1–3, while the superscript (′) is employed with a reference numeral which otherwise corresponds to one used in FIGS. 1–3 to denote a part which is similar in function, insofar as this invention is concerned, but which differs in order to convert a plug to a splice. The reference numeral 100 indicates generally a splice for joining a first flat cable $FC_1$ and a second flat cable $FC_2$. Splice 100 includes basically a plurality of contact elements 12′, a pair of housing blocks 20′, a pair of gaskets 42, a pair of end caps 40 and an interfacial sealing gasket to 44'. In addition, a pair of wedge bars 33 are employed, as also are a pair of mandrels 35.

Contact element 12', rather than having a pair of jaws 13 and 14 at one end and a tine 11 at the other end, has two pairs of confronting jaws 13 and 14, one pair disposed at each end, which in all respects and proportionate dimensions are identical to confronting jaws 13 and 14 of each contact element 12 and which are housed in blocks 20' in the same manner contact elements 12 are housed in block 20, except that rather than having a tine 11 project through each slot 29, the pairs of jaws 13 and 14 which are not housed in one block 20' project through a slot 29' in such block and a corresponding slot 29' into the other block 20'. A sealing gasket 44' is interposed between abutting faces 31' of blocks 20'. It will be apparent that ribs 30 and crosspiece 32 are necessarily omitted in the construction shown in FIG. 8 and that the assembly of the device is essentially the same as that described with reference to the device of FIGS. 1–7.

I claim:
1. A terminal device for an electric conductor which includes a contact element integrally formed of resilient conductive material, said element at one end thereof having a pair of jaws which define a throat therebetween, said throat having an outer portion adjacent said end of said element, an inner portion remote from said end of said element, and an intermediate portion disposed between said inner and outer portions of said throat, said jaws when unstressed being spaced apart a greater distance at said inner portion of said throat than at said intermediate portion of said throat, wedge means having a size larger than the unstressed spacing of said jaws in said intermediate portion of said throat and less than the spacing of said jaws in said inner portion of said throat, said wedge means having a free outer end located within said throat and an inner portion in contact with said intermediate portion of said throat thereby to space said jaws farther apart than when unstressed, whereby a portion of an electric conductor can be inserted into the outer portion of said throat against said wedge means to move said wedge means into the inner portion of said throat to release said jaws and to permit said jaws to return toward an unstressed condition at the same time as said wedge means moves between said intermediate and inner portions of said throat thereby making raking electric contact of said jaws with said conductor.

2. A terminal device according to claim 1 which further includes teeth on the confronting surfaces of said jaws in the outer portion of said throat.

3. A terminal device according to claim 1 in which said conductor is a component of a flat cable.

4. A connector for a multi-conductor cable which includes a plurality of terminal devices according to claim 1, a dielectric block having a well therein, said devices being positioned aligned in said well with said wedge means associated with each said device forming a common wedge bar with the wedge means of the other devices in said well.

5. A connective device for multi-conductor cable which includes: a plurality of contact elements each integrally formed of resilient conductive material, each said element at one end thereof having a pair of jaws which define a throat therebetween, said throat having an outer portion adjacent said end of said element, an inner portion remote from said end of said element, and an intermediate portion disposed between said inner and outer portions of said throat, said jaws when unstressed being spaced apart a greater distance at said inner portion of said throat than at said intermediate portion of said throat, said jaws having teeth on the confronting surfaces thereof in said outer throat portion;

a dielectric block having a well therein, said contact elements being positioned aligned in said well; and a wedge bar having a thickness larger than the unstressed spacing of said jaws in said intermediate portion of said throat and less than the spacing of said jaws in said inner portion of said throat, said wedge bar being positioned across said well in the intermediate portions of the throats of said aligned elements thereby to space all said jaws farther apart than when unstressed, whereby portions of a multi-conductor flat cable having a conductor spacing corresponding to that of said elements and wrapped about a mandrel can be inserted into said well against said wedge bar to move said wedge bar into the inner portions of said throats to release all said jaws simultaneously and permit said jaws to return toward an unstressed condition at the same time as said wedge bar moves between said intermediate and inner portions of said throats thereby making raking electric contact of said jaws with said conductors.

References Cited

UNITED STATES PATENTS

| 2,711,523 | 6/1955 | Willis | 339—253 |
| 3,200,360 | 8/1965 | McKiel | 339—17 |

FOREIGN PATENTS

| 1,118,852 | 12/1961 | Germany. |

MARVIN A. CHAMPION, *Primary Examiner.*

J. H. McGLYNN, *Assistant Examiner.*